United States Patent [19]
Dooley, Jr. et al.

[11] Patent Number: 6,095,343
[45] Date of Patent: Aug. 1, 2000

[54] GRAVITY LIQUID FILTRATION APPARATUS

[76] Inventors: John P. Dooley, Jr., 1013 Deep Woods Trail, Brentwood, Tenn. 37027; Cecelia D. Moore, 141 Neese Dr. R-387; Harry A. Kiely, 239 Sunrise Ave., both of Nashville, Tenn. 37211; John D. Hood, Sr., 1889 Carter Creek Pike, Franklin, Tenn. 37064; Caleb N. Bell, III, 1107 Bradley Dr., Franklin, Tenn. 37069

[21] Appl. No.: 09/219,821

[22] Filed: Dec. 23, 1998

[51] Int. Cl.[7] .............................. B01D 33/04; B01D 29/09
[52] U.S. Cl. .......................... 210/387; 210/396; 210/456; 210/122; 210/401
[58] Field of Search .................................... 210/387, 396, 210/456, 122, 401

[56] References Cited

U.S. PATENT DOCUMENTS

| | | |
|---|---|---|
| 620,786 | 3/1899 | Koerper et al. . |
| 3,756,411 | 9/1973 | Kracklauer . |
| 4,057,437 | 11/1977 | Kracklauer . |
| 4,681,679 | 7/1987 | Reber . |
| 4,686,042 | 8/1987 | Eckardt ................................... 210/386 |
| 4,973,407 | 11/1990 | Wagner . |
| 5,238,565 | 8/1993 | Barcomb et al. . |

Primary Examiner—Thomas M. Lithgow
Attorney, Agent, or Firm—Zarley, McKee, Thomte, Voorhees & Sease; Dennis L. Thomte

[57] ABSTRACT

A gravity liquid filtration apparatus includes a housing with a pool forming assembly mounted between a pair of side walls in the housing. The pool forming assembly includes a central shaft with a pair of spaced-apart discs rotatably mounted on the shaft between the side walls. A filter media is supported on an endless loop carrier belt, and pressed against the peripheral edges of the containment discs along bottom arcs thereof to form a generally semi-cylindrical shaped pool. A liquid inflow assembly on the housing includes a delivery head with a nozzle portion having an elongated mouth aimed downwardly to discharge liquid onto a downwardly sloped portion of the filter media. A box is formed in the delivery head above the nozzle of a size to permit large objects such as pens and pencils to fall flat and be discharged through the mouth of the nozzle. Each disc in the pool forming assembly includes a groove along the peripheral edge with a resilient seal ring journaled in the groove to provide a seal against the filter media and carrier belt. Each disc includes a plurality of overflow apertures formed therein and located along a circle centered on the shaft. Pusher bar assemblies are mounted between the discs for pushing caked particulate off of the upper surface of the belt. A tensioner assembly supports each end of the shaft in the side walls, and includes a spring biased set collar which receives one end of the shaft to permit vertical movement of the shaft, but prevents horizontal and rotational movement of the shaft. The set collar is spring biased to maintain a biasing force of the discs against the filter media.

23 Claims, 5 Drawing Sheets

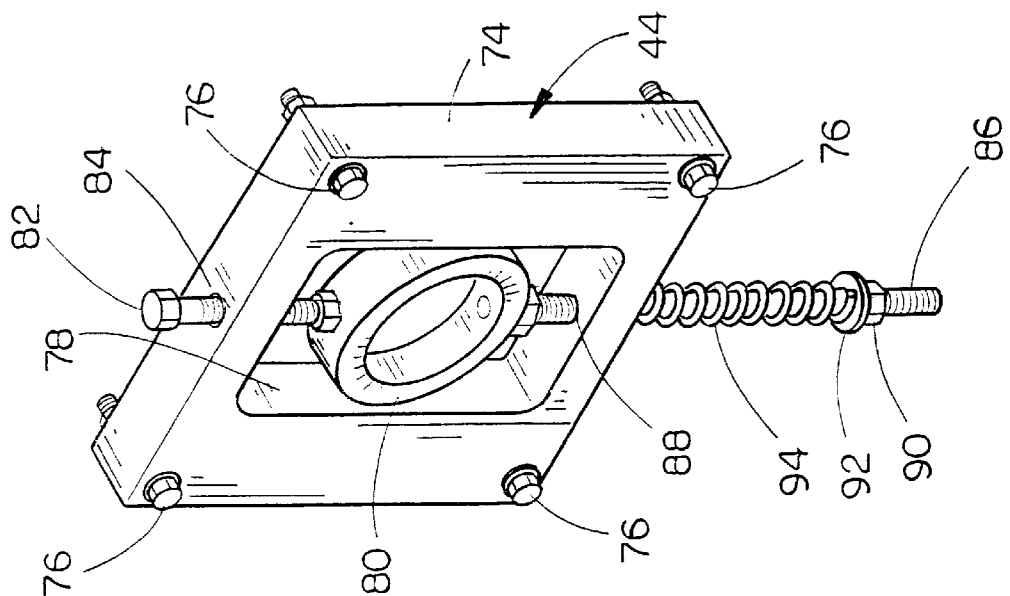
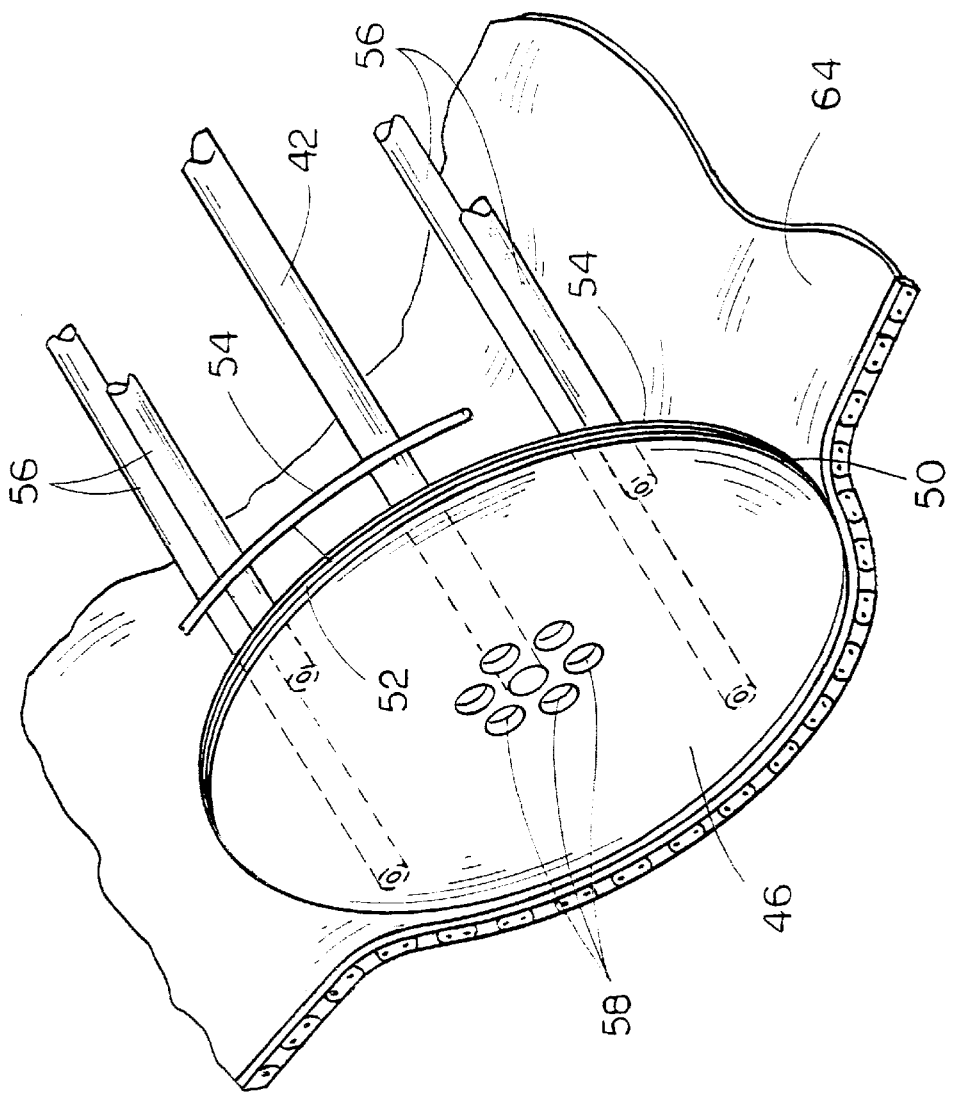

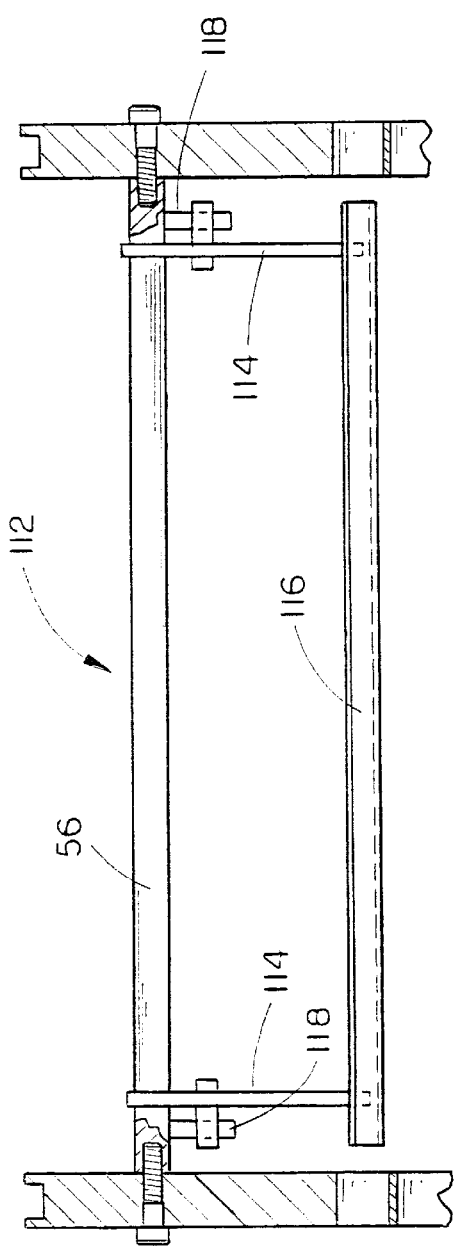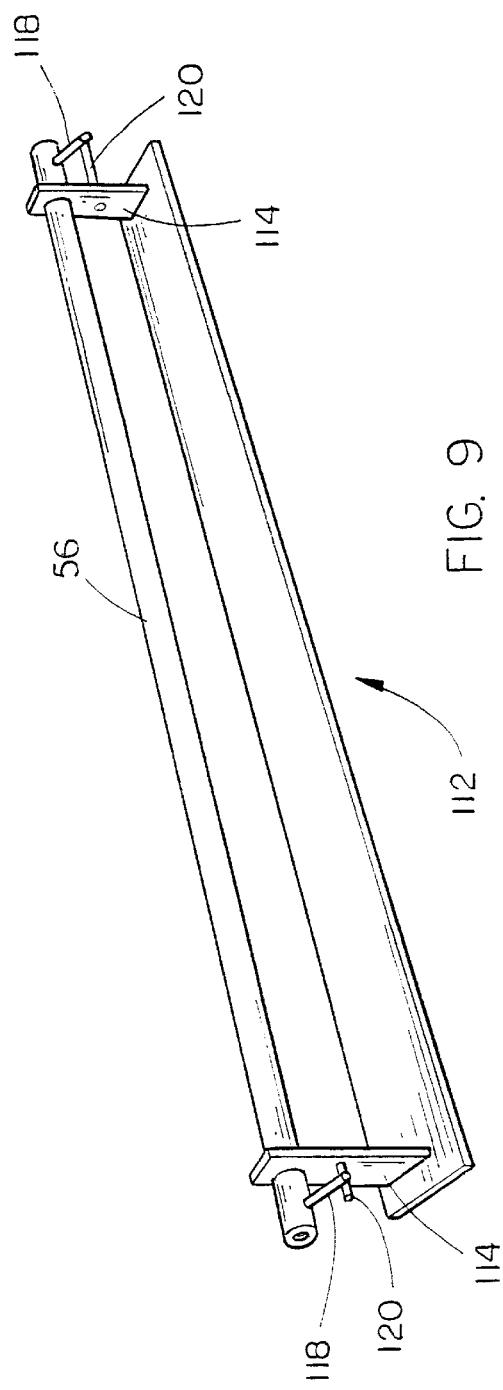

GRAVITY LIQUID FILTRATION APPARATUS

TECHNICAL FIELD

The present invention relates generally to filtration apparatus, and more particularly to an improved gravity filtration device.

BACKGROUND OF THE INVENTION

Gravity type filtration systems have been used for a number of years to filter particulate from liquids. In general, particulate laden liquid is spread across the width of filter media such that the liquid flows through the media while the particulate is caught within the media to form a cake. As the cake builds, liquid flow is restricted and the fluid level rises on top of the caked particulate to form a pool. Once the fluid level in the pool reaches a predetermined height, the apparatus will shift the media so that liquid again flows across an unobstructed portion of the media.

While these gravity liquid filtration devices have been known for some time, they still suffer several problems. First, it is typical for the media to form a semi-cylindrical shape by wrapping a portion of the media along the circumference of two spaced-apart discs. If liquid within the pool formed between the discs and on top of the filter media rises too quickly, spillage can occur. Thus, there is a need to form a tight seal between the discs and the media, and also to contain spillage within the system.

Inflow chutes on conventional filtration apparatus can easily become clogged with pencils and other foreign objects. It is therefore desirable to provide an apparatus for preventing foreign objects from clogging the inflow chute.

SUMMARY OF THE INVENTION

It is therefore a general object of the present invention to provide an improved gravity liquid filtration apparatus.

Another object is to provide a gravity liquid filtration apparatus which contains spillage within the system.

Yet another object of the present invention is to provide a filtration apparatus which provides an improved seal between the discs and filter media.

Yet another object is to provide a gravity filtration system which prevents clogging of the inflow chute.

These and other objects of the present invention will be apparent to those skilled in the art.

The gravity liquid filtration apparatus of the present invention includes a housing with a pool forming assembly mounted between a pair of side walls in the housing. The pool forming assembly includes a central shaft with a pair of spaced-apart discs rotatably mounted on the shaft between the side walls. A filter media is supported on an endless loop carrier belt, and pressed against the peripheral edges of the containment discs along bottom arcs thereof to form a generally semi-cylindrical shaped pool. A liquid inflow assembly on the housing includes a delivery head with a nozzle portion having an elongated mouth aimed downwardly to discharge liquid onto a downwardly sloped portion of the filter media. A box is formed in the delivery head above the nozzle of a size to permit large objects such as pens and pencils to fall flat and be discharged through the mouth of the nozzle. Each disc in the pool forming assembly includes a groove along the peripheral edge with a resilient seal ring journaled in the groove to provide a seal against the filter media and carrier belt. Each disc includes a plurality of overflow apertures formed therein and located along a circle centered on the shaft. A pusher bar assembly is mounted between the discs for pushing caked particulate off of the upper surface of the belt. A tensioner assembly supports each end of the shaft in the side walls, and includes a spring biased set collar which receives one end of the shaft to permit vertical movement of the shaft, but prevents horizontal and rotational movement of the shaft. The set collar is spring biased to maintain a biasing force of the discs against the filter media.

BRIEF DESCRIPTION OF THE DRAWINGS

FIG. 4 is an enlarged perspective view of one seal disc of the apparatus, with a portion of the seal ring removed from the disc;

FIG. 5 is an enlarged perspective view of one of the tensioner assemblies for the apparatus;

FIG. 8 is an elevational view of the pusher bar assembly; and

FIG. 9 is a perspective view of the pusher bar assembly.

DESCRIPTION OF THE PREFERRED EMBODIMENT

Figure 1:
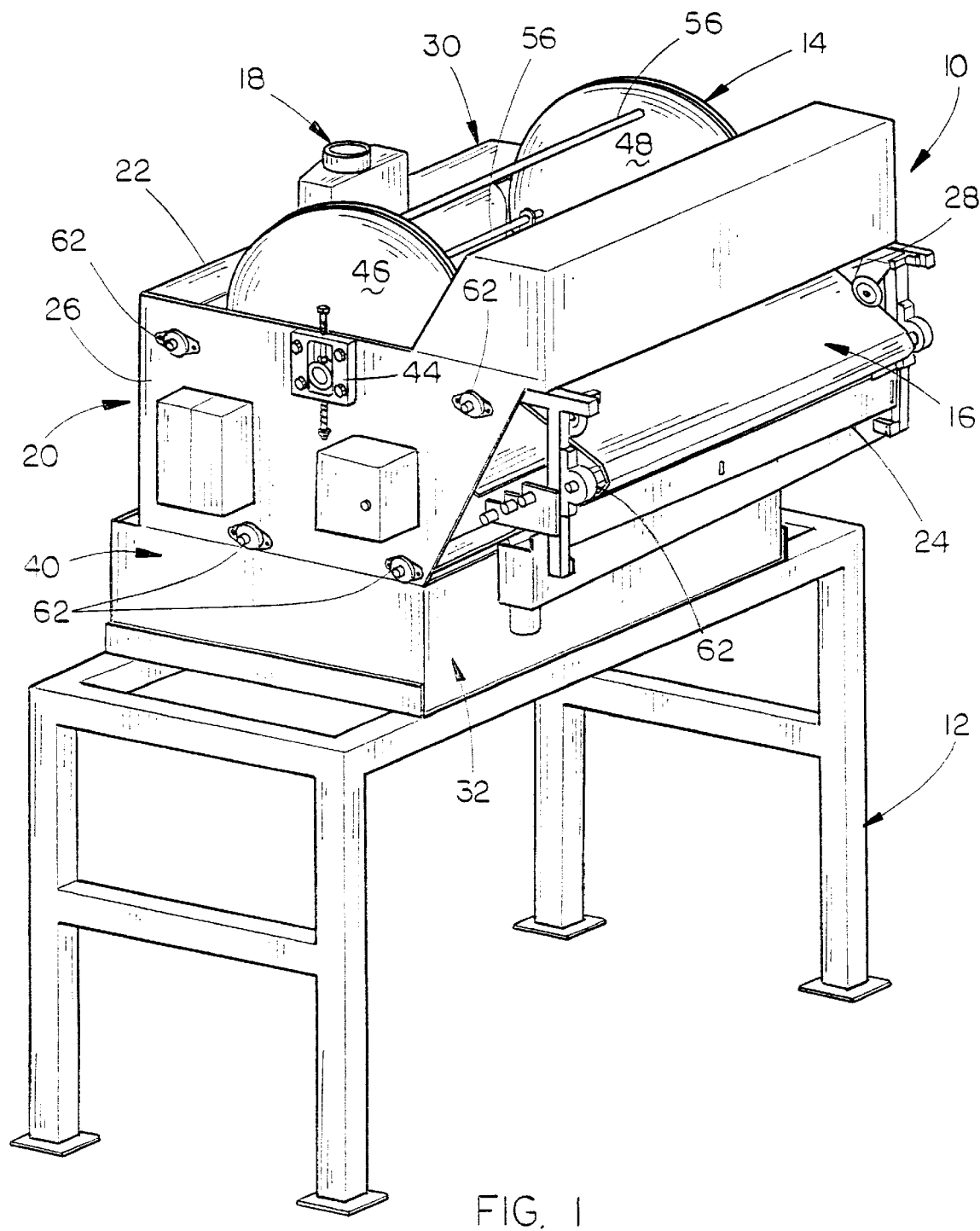
FIG. 1 is a perspective view of the gravity liquid filtration apparatus of the present invention.

Referring now to the drawings, in which similar or corresponding parts are identified with the same reference numeral, and more particularly to FIG. 1, the gravity liquid filtration apparatus of the present invention is designated generally at 10 and includes a support frame 12, a pool forming assembly 14, a filter medium carrier assembly 16, and a liquid inflow assembly 18.

A housing 20 supports the pool forming assembly 14, the filter medium carrier assembly 16, and the liquid inflow assembly 18, and includes a forward end 22, a rearward end 24, opposing side walls 26 and 28 and upper and lower ends 30 and 32. As seen in the drawings, a pair of forward and rearward drainage plates 34 and 36 converge towards one another to form a drainage opening therebetween as they extend downwardly to the lower end 32 of housing 20. These drainage plates function to guide liquid which has fallen thereon into a conventional liquid receiving drain tank 40 positioned under the lower end 32 of housing 20.

Figure 2:
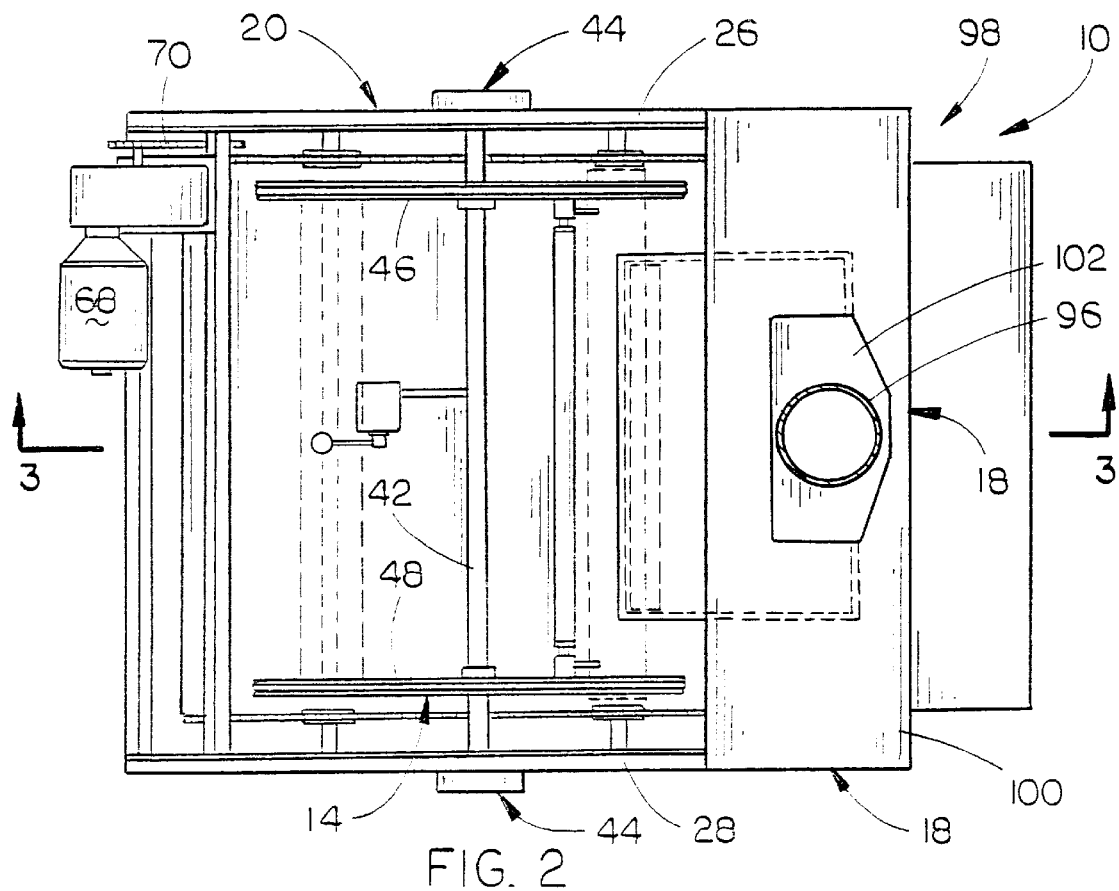
FIG. 2 is a plan view of the apparatus.
Figure 3:
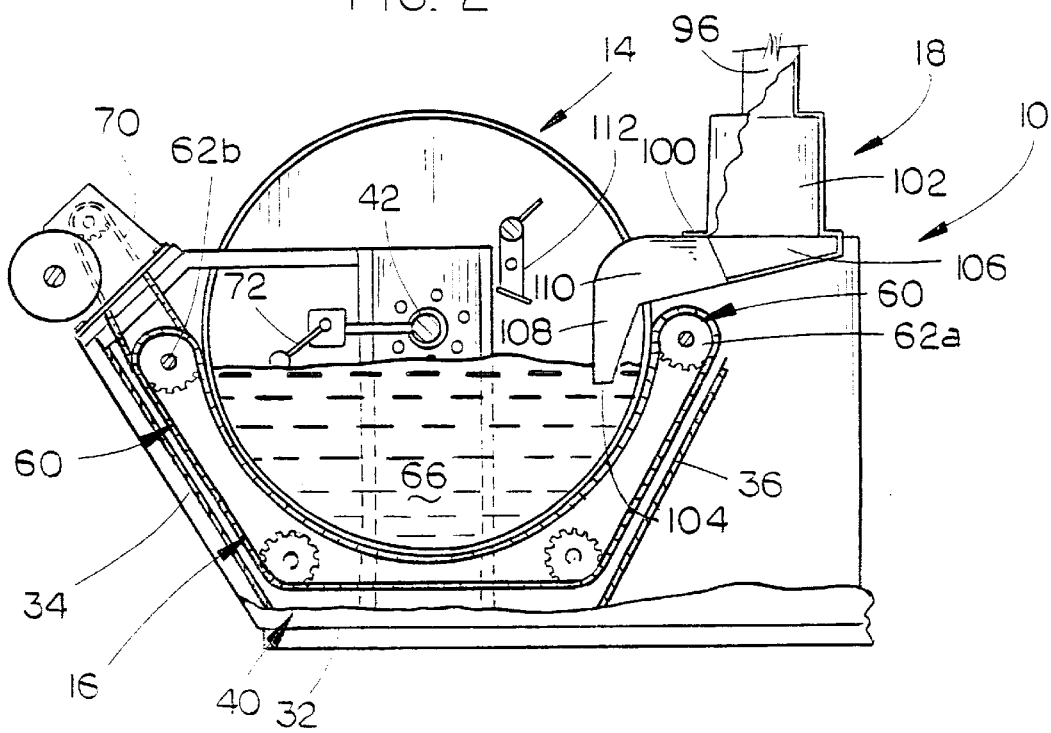
FIG. 3 is a sectional view taken at lines 3–3 in FIG. 2.

Referring now to FIGS. 2 and 3, the pool forming assembly 14 is positioned between side walls 26 and 28 and includes a central shaft 42 extending through each side wall 26 and 28, and having each end mounted in a tensioner assembly 44, described in more detail hereinbelow. A pair of containment discs 46 and 48 are mounted on each end of shaft 42 interiorly of and proximal to side walls 26 and 28 respectively. FIG. 4 shows an enlarged view of one disc 46 rotatably mounted on shaft 42, and including a peripheral edge 50. A groove 52 is formed around the entire peripheral edge 50 and receives a resilient seal ring 54 therein, preferably formed of molded polyurethane. A plurality of spacer bars 56 connect discs 46 and 48, and are oriented parallel to central shaft 42 and along a circle between the shaft 42 and peripheral edge 50. A plurality of overflow apertures 58 are formed through each disc 46 and 48 and located uniformly spaced-apart radially equidistant from shaft 42. The purpose of overflow apertures will be described in more detail hereinbelow.

Referring once again to FIG. 3, the filter medium carrier assembly 16 includes an endless carrier belt 60 having an open mesh design, and a plurality of rollers 62 around which the endless carrier belt is supported, all of these rollers being generally located inwardly of drainage plates 34 and 36. A forward roller 62a and a rearward roller 62b are positioned near opposite locations along the corresponding peripheral edges of containment discs 46 and 48, such that an upper run of the endless carrier belt 60 extending therebetween will be pressed along the peripheral edges of the disc along corresponding bottom arcs thereof. When filter media 64 is supported on the carrier belt along this run, it will be pressed against the seal rings 54 along corresponding bottom arcs of the peripheral edges of the discs 46 and 48, thereby permitting a pool of liquid 66 to be formed above the filter media 64 and between the discs 46 and 48.

The filter medium carrier assembly 16 also includes a drive motor 68 which is mounted on the rearward end of housing 20, with a drive chain 70 connected between the drive motor 68 and a sprocket on rearward roller 62b. The operation of drive motor 68 is controlled by the switch 72 which may be a float switch, conductive switch, or hydrostatic switch.

Referring now to FIG. 5, one tensioner assembly 44 is shown in more detail. Tensioner assembly 44 includes a rectangular block 74 of polypropylene material which is mounted to a side wall of the housing by bolts 76. A rectangular opening 78 is disposed centrally through block 74, which will retain a set collar 80 which supports one end of the central shaft 42 of the pool forming assembly 14. A hex head bolt 82 is journaled through a vertical aperture 84 formed in an upper edge of block 74, and has its lower end affixed to an upper end of set collar 80, to permit vertical movement of set collar as bolt 82 slides through aperture 84. A threaded rod 86 is mounted on a lower end of set collar 80 and projects downwardly through an aperture 88 in the lower end of block 74. A pair of nuts 90 are threaded on the lower end of rod 86 and support a washer 92 thereon. A coil spring 94 is interposed on rod 86 between washer 92 and a lower face of block 74, to apply a downward biasing force on washer 92, nuts 90, rod 86, and set collar 80. In this way, tension spring 94 will apply a biasing force on the central shaft 42 of the pool forming assembly 14 to keep discs 46 and 48 in constant contact with the filter media 64 and carrier belt 60 to ensure a leak proof seal. Each hex head bolt 82 may be threaded downwardly through set collar 80 to contact the central shaft 42, and prevent horizontal movement and rotation of the central shaft, while permitting vertical movement thereof.

Figure 6:
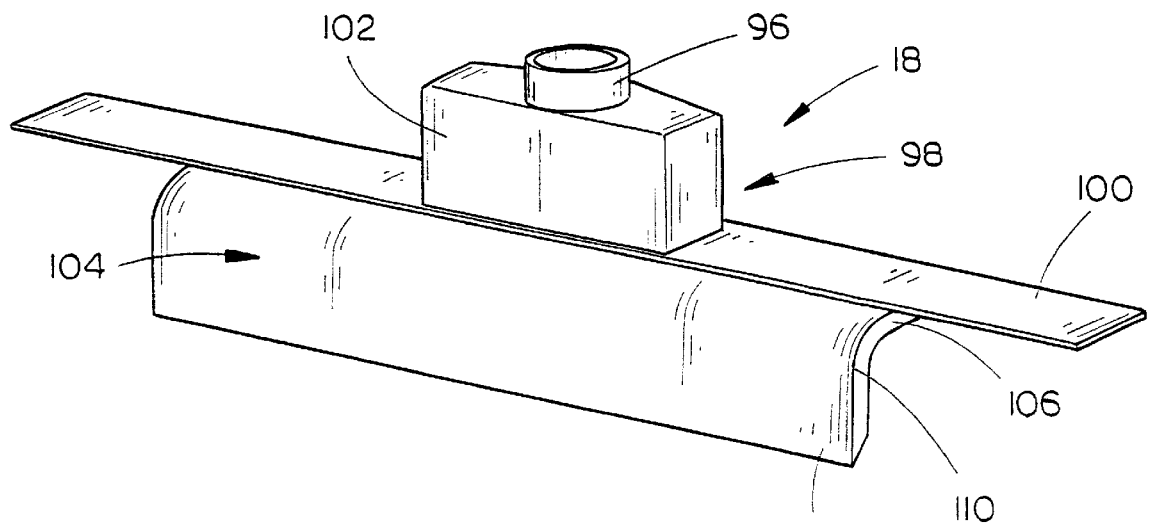
FIG. 6 is an enlarged perspective view of the inflow chute of the apparatus.

Referring now to FIGS. 2, 3, and 6, the liquid inflow assembly 18 includes an inlet tube 96 connected to a delivery head 98, mounted on a support plate 100 which mounts the delivery head on top of housing 20 near its forward end 22. A vertically oriented box 102 is mounted at the discharge end of inlet tube 96, atop support plate 100. Box 102 has a width extending transversely along support plate 100, substantially greater in width than inlet tube 96. Box 102 has a height which is generally about the length of a pen or pencil, or about six inches. In this way, a pen or pencil, or similar object which may be discharged through inlet tube 96, will have space to fall flat within box 102 and then be discharged through nozzle 104, rather than clogging inlet tube 96.

As shown in FIG. 3, support plate 100 has an opening therethrough the same size as box 102, so that box 102 opens directly into an upper chamber 106 of nozzle 104. Nozzle 104 extends transversely under support plate 100 between discs 46 and 48, and is formed from a shallow depth tubular member having a horizontally oriented upper chamber 106, a downwardly directed mouth 108, and an arcuate chamber 110 connecting the upper chamber to the mouth. Mouth 108 is directed downwardly between and radially inwardly of the peripheral edges of discs 46 and 48 to provide a downwardly directed discharge of influent liquid directed against a downwardly sloped portion of the filter media 64. Thus, mouth 108 spreads the influent liquid and particulate across the width of the filter media 64 to maximize the usage of the media. Box 102 allows large objects such as pens and pencils to lay down flat and pass through nozzle 104 without obstructing the nozzle or the inlet tube 96.

Referring once again to FIGS. 1–3, at least one of the spacer bars 56 includes a pusher bar assembly 112 thereon to help push large objects and sludge out of the filter pool, over the top of rearward roller 62b, and to prevent these objects and sludge from falling back into the filter pool. Referring more specifically to FIGS. 8 and 9, pusher bar assembly 112 includes a pair of spaced-apart parallel support arms 114 pivotally connected to spacer bar 56 near the opposite ends of the spacer bar. A shovel bar 116 is mounted to the depending ends of support arms 114, and is preferably formed of a piece of flat strap, so as to have a rectangular cross-section.

Figure 7:
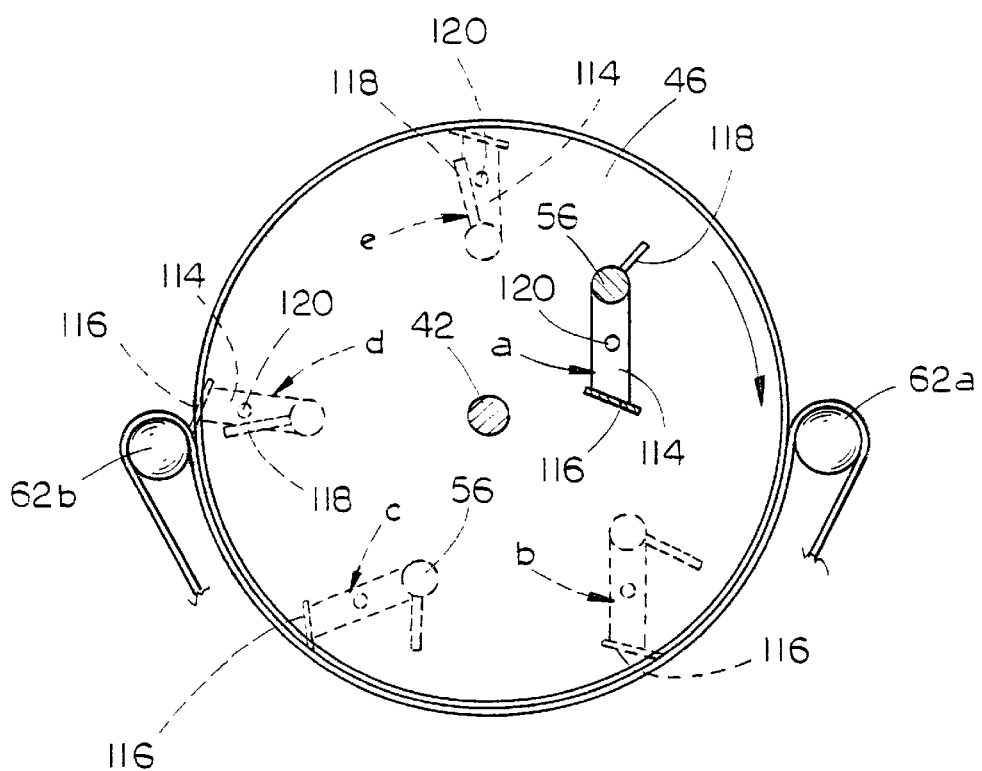
FIG. 7 is a cross-sectional view through the pool forming assembly showing movement of the pusher bar therein.

A lift pin 118 is mounted on each end of the spacer bar 56 proximal to each support arm 114, for rotation with the spacer bar, as the spacer bar rotates with the containment discs 46 and 48. A support pin 120 is affixed to each support arm 114 and oriented parallel to the spacer bar and projecting from each support arm 114 so as to project into the path of the associated lift pin 118. As the two containment discs 46 and 48 rotate around the central shaft 42, the shovel bar 116 will rotate around spacer bar 56 on support arms 114, as shown in FIG. 7 as positions A, B, C, D, and E.

In position A, shovel bar 116 hangs freely downwardly from spacer bar 56. In position B, shovel bar 116 is in initial contact with a run of the media belt on the carrier belt along the bottom arc of disc 46 and 48. In position C, shovel bar 116 has swung to some extent about spacer bar 56 due to the location of spacer bar 56 near the peripheral edges of the discs 46 and 48. In position D, support arms 114 have moved to a substantially horizontal position and shovel bar 116 has moved to a generally vertical position with an edge of the shovel bar 116 extending somewhat radially outwardly of the peripheral edges of the containment discs 46 and 48, and just above the rearward roller 62b. In this position, the lift pins 118 abut against the support pins 120 on the support arms 114, to raise the support arms 114 upwardly as the discs continue to rotate. In position E, the support arms 114 are oriented generally vertically due to contact between the lift pins 118 and support pins 120. Between positions E and A, the shovel bar 116 will swing freely about spacer bar 56 to hang vertically downward once again.

Contact of the shovel arm 116 against the filter medium between positions B and D helps force solids and other objects, which might otherwise slide back into the pool by gravity, out of the liquid pool and over the rearward roller 62b.

In operation, the gravity liquid filtration apparatus 10 will receive influent liquid through inlet tube 96, as shown in FIG. 3. The influent liquid will first pass through box 102, wherein large objects such as pens and pencils will contact the generally horizontal bottom wall of upper chamber 106 of nozzle 104, and fall flat. The influent liquid is then discharged through mouth 108 of nozzle 104 and spread across the extent of the filter media 64 along the downwardly sloped portion of the belt, below the forward roller 62a between discs 46 and 48. Liquid will pass through the filter media 64, then through the carrier belt 60 and, with the help of drainage plates 34 and 36, through the drainage opening 38 into the drain tank 40, while solid contaminants such as sludge are deposited on the filter medium 64.

As the solid contaminants accumulate and cake on the filter medium 64, liquid will flow therethrough less easily, resulting in the formation of liquid pool 66 above the bottom arcs of discs 46 and 48, where the filter media is in sealed engagement, and between discs 46 and 48. The level of the liquid pool 66 will rise, until the solid contaminants form a nonpermeable cake on the filter medium. A level of the pool 66 will keep on rising until it causes the switch 72 to activate the drive motor 68. Drive motor 68 will rotate the driven rearward roller 62b, which will in turn cause the carrier belt 60 to move around the rollers 62, resulting in rotation of the two containment discs 46 and 48 and movement of a new run of filter medium 64 into the liquid pool 66. With a new run of filter medium 64 at the bottom of the liquid pool 66, liquid will flow therethrough and the liquid pool will drop. At a certain level, the switch 72 will cause the drive motor 68 to stop operating. A movement of the filter medium 64 into the liquid pool 66 by carrier belt 60 will thereby be stopped.

Overflow apertures 58 in seal discs 46 and 48 are located adjacent central shaft 42 to contain any spillage within the system. Solid contaminants that have been deposited on the filter medium 64 will pass with the filter medium around the rearward roller 62b and will drop by gravity downwardly into a waste receptacle. The solid contaminants are assisted over roller 62b by pusher bar assembly 112, as discussed in more detail hereinabove.

Whereas the invention has been shown and described in connection with the preferred embodiment thereof, many modifications, substitutions and additions may be made which are within the intended broad scope of the appended claims.

We claim:

1. A gravity liquid filtration apparatus, comprising:
   a housing having forward and rearward ends, opposing vertical side walls, and upper and lower ends;
   a pool forming assembly operably mounted between the side walls, including:
      a central shaft extending generally horizontally between the side walls;
      a pair of spaced-apart containment discs rotatably mounted on said shaft, said containment discs each having a peripheral edge and a plurality of overflow apertures formed therethrough and located generally along a circle centered on the shaft;
   an elongated filter medium for filtering particulate from liquid passing through the filter medium belt;
   an elongated filter medium carrier belt for supporting said filter medium belt and for pressing it against the peripheral edges of the containment discs along corresponding bottom arcs thereof;
   said carrier belt formed of an endless web and a plurality of rollers which support the endless belt such that a run thereof is pressed towards the bottom arcs of the containment discs;
   drive means for driving the carrier belt; and
   a liquid inflow assembly on said housing including:
      a delivery head having a nozzle portion extending between and radially inwardly of the peripheries of the discs;
      said nozzle portion having an elongated mouth which is aimed downwardly so as to discharge liquid to be filtered onto a downwardly sloped portion of the filter medium supported on the carrier belt.

2. The apparatus of claim 1, wherein each containment disc includes a groove formed along the entire peripheral edge, and further including a resilient seal ring journaled along the extent of the groove and projecting radially therefrom in sealed engagement along the bottom arc against the filter medium and carrier belt.

3. The apparatus of claim 2, wherein said nozzle portion includes an upper chamber having a generally horizontal bottom wall, the upper chamber connected to the mouth by an arcuate chamber, wherein said inflow assembly includes a vertically oriented inlet tube through which inflow liquid is discharged into the delivery head.

4. The apparatus of claim 3, wherein said delivery head includes a box, and said box has a height of at least about six inches.

5. The apparatus of claim 4, further comprising a pusher bar assembly mounted between the discs, for pushing caked particulate formed on an upper surface of the filter belt within the pool forming assembly, the pusher bar assembly including:
   a spacer bar extending between the discs, spaced radially inwardly of the peripheral edges, for movement with the rotation of the discs;
   a pair of spaced-apart, parallel support arms pivotally mounted at first ends on the spacer bar; and
   a shovel bar mounted on second ends of the support arms and oriented parallel to the spacer bar, which can contact a run of the filter medium belt on the carrier belt along the bottom arcs of the discs.

6. The apparatus of claim 5, wherein the shovel bar is rectangular in cross-section.

7. The apparatus of claim 6, wherein the pusher bar assembly further includes:
   a lift pin mounted on each end of the spacer bar proximal each support arm, for rotation with the spacer bar and extending radially outwardly therefrom; and
   a support pin mounted on each support arm oriented parallel to the spacer bar and projecting from each support arm to an extent which will place it in contact with a lift pin as the support arms pivot on the spacer bar.

8. The apparatus of claim 7, further comprising a tensioner assembly connected between each end of the shaft and the associated side wall, for biasing the shaft vertically downwardly while preventing horizontal, longitudinal, and rotational movement of the shaft.

9. The apparatus of claim 8, wherein each said tensioner assembly includes:
   a block fastened to the side wall, having a horizontal opening formed therethrough through which one end of the shaft projects;
   a set collar positioned within the block opening and secured to the end of the shaft with a set screw;
   a rod mounted on a lower portion of the set collar and projecting through a vertically oriented guide aperture in the block below the block opening;
   a stop member on a lower end of the rod spaced below the block; and biasing means between the stop member and block for biasing the stop member, rod, set collar and shaft vertically downwardly.

10. The apparatus of claim 9, wherein the rod is threaded, and wherein the stop member is threaded on the rod, for selective adjustment therealong.

11. The apparatus of claim 10, wherein the set screw is aligned coaxially with the rod, and journaled through a vertical aperture in the block above the block opening.

12. The apparatus of claim 1, wherein said nozzle portion includes an upper chamber having a generally horizontal bottom wall, the upper chamber connected to the mouth by an arcuate chamber, wherein said inflow assembly includes a vertically oriented inlet tube through which inflow liquid is discharged into the delivery head.

13. The apparatus of claim 1, further comprising a pusher bar assembly mounted between the discs, for pushing caked particulate formed on an upper surface of the filter belt within the pool forming assembly, the pusher bar assembly including:
 a spacer bar extending between the discs, spaced radially inwardly of the peripheral edges, for movement with the rotation of the discs;
 a pair of spaced-apart, parallel support arms pivotally mounted at first ends on the spacer bar; and
 a shovel bar mounted on second ends of the support arms and oriented parallel to the spacer bar, which can contact a run of the filter medium on the carrier belt along the bottom arcs of the discs.

14. The apparatus of claim 13, wherein the pusher bar assembly further includes:
 a lift pin mounted on each end of the spacer bar proximal each support arm, for rotation with the spacer bar and extending radially outwardly therefrom; and
 a support pin mounted on each support arm oriented parallel to the spacer bar and projecting from each support arm to an extent which will place it in contact with a lift pin as the support arms pivot on the spacer bar.

15. The apparatus of claim 1, further comprising a tensioner assembly connected between each end of the shaft and the associated side wall, for biasing the shaft vertically downwardly while preventing horizontal, longitudinal, and rotational movement of the shaft.

16. The apparatus of claim 15, wherein each said tensioner assembly includes:
 a block fastened to the side wall, having a horizontal opening formed therethrough through which one end of the shaft projects;
 a set collar positioned within the block opening and secured to the end of the shaft with a set screw;
 a rod mounted on a lower portion of the set collar and projecting through a vertically oriented guide aperture in the block below the block opening;
 a stop member on a lower end of the rod spaced below the block; and
 biasing means between the stop member and block for biasing the stop member, rod, set collar and shaft vertically downwardly.

17. A gravity liquid filtration apparatus, comprising:
 a housing having forward and rearward ends, opposing vertical side walls, and upper and lower ends;
 a pool forming assembly operably mounted between the side walls, including:
  a central shaft extending generally horizontally between the side walls;
  a pair of spaced-apart containment discs rotatably mounted on said shaft, said containment discs each having a peripheral edge and a plurality of overflow apertures formed therethrough and located generally along a circle centered on the shaft;
 an elongated filter medium for filtering particulate from liquid passing through the filter medium;
 an elongated filter medium carrier belt for supporting said filter medium and for pressing it against the peripheral edges of the containment discs along corresponding bottom arcs thereof;
 said carrier belt formed of an endless belt and a plurality of rollers which support the endless belt such that a run thereof is pressed towards the bottom arcs of the containment discs;
 drive means for driving the carrier belt; and
 a liquid inflow assembly on said housing including:
  a delivery head having a nozzle portion extending between and radially inwardly of the peripheries of the discs;
  said nozzle portion having an elongated mouth which is aimed downwardly so as to discharge liquid to be filtered onto a downwardly sloped portion of the filter medium supported on the carrier belt;
  said nozzle portion including an upper chamber having a generally horizontal bottom wall, the upper chamber connected to the mouth by an arcuate chamber;
  a vertically oriented inlet tube through which inflow liquid is discharged into the delivery head;
  said delivery head including a box having an open upper end communicating with the inlet tube and an open lower end communicating with the upper chamber of the nozzle portion, the box having a transverse width greater than a diameter of the inlet tube and extending towards the side walls, and a height of at least about six inches.

18. A gravity liquid filtration apparatus, comprising:
 a housing having forward and rearward ends, opposing vertical side walls, and upper and lower ends;
 a pool forming assembly operably mounted between the side walls, including:
  a central shaft extending generally horizontally between the side walls;
  a pair of spaced-apart containment discs rotatably mounted on said shaft, said containment discs each having a peripheral edge and a plurality of overflow apertures formed therethrough and located generally along a circle centered on the shaft;
 an elongated filter medium for filtering particulate from liquid passing through the filter medium;
 an elongated filter medium carrier belt for supporting said filter medium and for pressing it against the peripheral edges of the containment discs along corresponding bottom arcs thereof;
 said carrier belt formed of an endless belt and a plurality of rollers which support the endless belt such that a run thereof is pressed towards the bottom arcs of the containment discs;
 drive means for driving the carrier belt; and
 a liquid inflow assembly on said housing including:
  a delivery head having a nozzle portion extending between and radially inwardly of the peripheries of the discs;
  said nozzle portion having an elongated mouth which is aimed downwardly so as to discharge liquid to be filtered onto a downwardly sloped portion of the filter media supported on the carrier belt; and a pusher bar assembly mounted between the discs, including:

a spacer bar extending between the discs, spaced radially inwardly of the peripheral edges, for movement with the rotation of the discs;

a pair of spaced-apart, parallel support arms pivotally mounted at first ends on the spacer bar; and a shovel bar mounted on second ends of the support arms and oriented parallel to the spacer bar, which can contact a run of the filter medium on the carrier belt along the bottom arcs of the discs.

19. The apparatus of claim 18, wherein the pusher bar assembly further includes:

a lift pin mounted on each end of the spacer bar proximal each support arm, for rotation with the spacer bar and extending radially outwardly therefrom; and a support pin mounted on each support arm oriented parallel to the spacer bar and projecting from each support arm to an extent which will place it in contact with a lift pin as the support arms pivot on the spacer bar.

20. A gravity liquid filtration apparatus, comprising:

a housing having forward and rearward ends, opposing vertical side walls, and upper and lower ends;

a pool forming assembly operably mounted between the side walls, including:

a central shaft extending generally horizontally between the side walls;

a pair of spaced-apart containment discs rotatably mounted on said shaft, said containment discs each having a peripheral edge and a plurality of overflow apertures formed therethrough and located generally along a circle centered on the shaft;

an elongated filter medium for filtering particulate from liquid passing through the filter medium;

an elongated filter medium carrier belt for supporting said filter medium and for pressing it against the peripheral edges of the containment discs along corresponding bottom arcs thereof;

said carrier belt formed of an endless belt and a plurality of rollers which support the endless belt such that a run thereof is pressed towards the bottom arcs of the containment discs;

drive means for driving the carrier belt; and a liquid inflow assembly on said housing including:

a delivery head having a nozzle portion extending between and radially inwardly of the peripheries of the discs;

said nozzle portion having an elongated mouth which is aimed downwardly so as to discharge liquid to be filtered onto a downwardly sloped portion of the filter media supported on the carrier belt; and a tensioner assembly connected between each end of the shaft and the associated side wall, for biasing the shaft vertically downwardly while preventing horizontal, longitudinal, and rotational movement of the shaft.

21. The apparatus of claim 20, wherein each said tensioner assembly includes:

a block fastened to the side wall, having a horizontal opening formed therethrough through which one end of the shaft projects;

a set collar positioned within the block opening and secured to the end of the shaft with a set screw;

a rod mounted on a lower portion of the set collar and projecting through a vertically oriented guide aperture in the block below the block opening;

a stop member on a lower end of the rod spaced below the block; and biasing means between the stop member and block for biasing the stop member, rod, set collar and shaft vertically downwardly.

22. The apparatus of claim 21, wherein the rod is threaded, and wherein the stop member is threaded on the rod, for selective adjustment therealong.

23. The apparatus of claim 22, wherein the set screw is aligned coaxially with the rod, and journaled through a vertical aperture in the block above the block opening.

* * * * *